(12) United States Patent
Ramos De Barros

(10) Patent No.: US 9,664,294 B2
(45) Date of Patent: May 30, 2017

(54) FLOW CONTROL VALVE FOR A HAND HELD BIDET SHOWER

(71) Applicant: FABRIMAR S/A INDÚSTRIA E COMÉRCIO, Rio de Janeiro—RJ (BR)

(72) Inventor: Carlos Augusto Ramos De Barros, Rio de Janeiro (BR)

(73) Assignee: FABRIMAR S/A INDUSTRIA E COMERCIO, Rio de Janeiro-RJ (BR)

( * ) Notice: Subject to any disclaimer, the term of this patent is extended or adjusted under 35 U.S.C. 154(b) by 145 days.

(21) Appl. No.: 14/431,630

(22) PCT Filed: Sep. 30, 2013

(86) PCT No.: PCT/BR2013/000380
§ 371 (c)(1),
(2) Date: Mar. 26, 2015

(87) PCT Pub. No.: WO2014/053035
PCT Pub. Date: Apr. 10, 2014

(65) Prior Publication Data
US 2015/0240956 A1    Aug. 27, 2015

(30) Foreign Application Priority Data
Oct. 3, 2012    (BR) .............................. 102010252775

(51) Int. Cl.
*F16K 11/044*    (2006.01)
*E03D 9/08*    (2006.01)
*E03C 1/04*    (2006.01)

(52) U.S. Cl.
CPC .......... *F16K 11/044* (2013.01); *E03C 1/0408* (2013.01); *E03D 9/08* (2013.01); *E03D 9/085* (2013.01)

(58) Field of Classification Search
CPC . F16K 27/045; F16K 3/04; F16K 3/06; F16K 3/02; F16K 3/0218; F16K 3/0236; F16K 11/04; F16K 11/048
See application file for complete search history.

(56) References Cited

U.S. PATENT DOCUMENTS 2,364,491 A * 12/1944 Triadou .................. E03D 9/085
239/530
3,189,318 A * 6/1965 Monson ............... B67D 1/1438
251/174

(Continued)

*Primary Examiner* — Erin Deery
(74) *Attorney, Agent, or Firm* — Abelman, Frayne & Schwab

(57) ABSTRACT

The control valve (R) comprises a body (10) having: an outlet nozzle (12) connected to a flexible conduct (20) whose outlet end (22) is connected to a pistol (30); a sealing seat (S); and a movable sealing means (V) to be displaced between closing and opening positions of the seat (S). A rod (90) has an inner end (91) coupled to the movable sealing means (V), an outer end (92), and a median region (93) mounted in the body (10). The rod (90) may be displaced, in a vertical plane and around a median transversal axis, so as to have its outer end (92) conducted to lowered and raised positions, in which the movable sealing means (V) is conducted to the closing and opening positions of the seat (S). A support (100) is provided in the outer end (92) of the rod (90), in order to receive and retain the pistol (30) when in an inoperative condition, producing the closing of the control valve (R).

5 Claims, 4 Drawing Sheets

(56) References Cited

U.S. PATENT DOCUMENTS

| | | | | |
|---|---|---|---|---|
| 6,682,047 B1* | 1/2004 | Piscaer | ............... | A47J 31/46 |
| | | | | 222/504 |
| 9,004,446 B2* | 4/2015 | Tsai | ............... | F16K 31/0668 |
| | | | | 251/129.19 |
| 2007/0119507 A1* | 5/2007 | Morita | ............ | E03C 1/04 |
| | | | | 137/625.4 |

* cited by examiner

FLOW CONTROL VALVE FOR A HAND HELD BIDET SHOWER

FIELD OF THE INVENTION

The present invention refers to a control valve for providing the automatic opening and closure of the supply of the pressurized water to the usual flexible conduct of a hand held bidet shower, of the type normally used in bathrooms and several other applications in which it is convenient to provide a pressurized water flow, whose positioning may be manually controlled by the user.

BACKGROUND OF THE INVENTION

Hand held bidet showers are well known and commercialized in the market of hydraulic devices, usually for substituting the known bidet, but which may be also applied in other hydraulic installations. Said hand held bidet showers are usually formed by: a control valve (or faucet) of manual operation and mounted to the water outlet of a hydraulic supply system; a flexible conduct (hose) having an inlet end connected to the control valve; a pistol, generally provided with a trigger valve which is mounted to an outlet end of the flexible conduct; and a support, usually affixed to a wall of a building and in which is seated the pistol when in the inoperative condition.

The pistol may be further provided with a lock operatively associated with the trigger, so that the valve can be maintained in an open condition, even when the user ceases to press the trigger.

In the installations of said known hand held bidet showers, the manually actuated control valve controls the opening and closure of the water supply to the pistol, through the flexible conduct, having a usually standard adequate length and which is usually constructed to withstand the dynamic pressure upon operation of the hand held bidet shower, particularly upon the closure of the pistol valve, when the user interrupts his actuation on the trigger.

In said known type of installation, mainly in those which operate under high pressure and use a manual control valve, it is highly recommended that the control valve is always closed after using the bidet shower, preferably before releasing the trigger for closing the pistol valve. The purpose of said recommendation is to avoid that an accidental rupture in the flexible conduct, caused by the sudden increase or long duration of the pressure in the hydraulic system, or by weakening, due to fatigue or wear of the flexible conduct, causes leaks of the pressurized water to the bathroom environments, while the control valve remains open.

Nevertheless, even with the recommendation of the manufacturers, the user frequently leaves the control valve open after using the bidet shower, which makes the blocking of the water flow guaranteed only by the trigger valve of the pistol, downstream the flexible conduct, which remains continuously pressed by the hydraulic supply system. In such type of solution, in case it occurs an accidental rupture in the flexible conduct, with the control valve left in the open condition, pressurized water will inevitably leak to the installation environment, causing damages, whose degree will depend on the extension of the rupture of the flexible conduct, on the pressure reigning in the hydraulic supply system, and also on the particularities of the installation place. Such occurrence may also lead the user to suit the manufacturer for damages.

Aiming at overcoming the inconvenience mentioned above, it was proposed a constructive solution in which the support that receives and retains the pistol in its inoperative condition is coupled to the driving means of the control valve, so that the user himself controls the opening and closure of the control valve, by moving the pistol between the operative position, when removed from the support, and the inoperative position, when received and retained on the support.

However, while allowing controlling the opening and closure of the control valve by the user, guaranteeing, in a practically automatic way, the closing of the control valve when the pistol returns to its inoperative condition on the support, said prior art solution requires the rotative displacement of the driving means, for allowing the sealing means of the control valve to be conducted to its opening and closing operational positions in the seat of the control valve. Besides, said rotative displacement should be fully completed by the user, otherwise the control valve will not be totally closed, maintaining the pressurization of the hose, and consequently the risk of leaks.

SUMMARY OF THE INVENTION

In view of the inconvenience pointed out above and related to the prior art, the present invention has the object of providing, by means of a simple, reliable and easy-to-install construction, a flow control valve, to be applied to a hand held bidet shower of the type discussed above, and which may be easily and automatically opened and closed as a function of the operational positioning the user wishes to place the pistol, guaranteeing, respectively, the pressurized supply of the flexible conduct and the interruption of said supply.

The present control valve is of the type which comprises a body provided with: an inlet nozzle to be connected to a hydraulic system; an outlet nozzle connected to an inlet nozzle of a flexible conduct which has an outlet end connected to a pistol provided with a trigger valve; an auxiliary nozzle; a sealing seat, communicating the inlet and outlet nozzles; a movable sealing means, operatively associated with the sealing seat and to be displaced between closing and opening positions of the seat; and a driving means for displacing the movable sealing means.

According to the invention, the driving means comprises a rod having an inner end coupled to the movable sealing means, an outer end projecting outwardly from the body through the auxiliary nozzle, and a median region mounted in the body, which allows said rod to be angularly and linearly displaced, in a vertical plane and around a median transversal axis, between extreme operational positions, with the outer end in lowered and raised positions, in which the movable sealing means is conducted to the closing and opening positions of the seat, respectively, the outer end of the rod being further provided with a support for receiving and retaining the pistol when the latter is found in an inoperative condition.

With the control valve mentioned above, in order to drive the hand held bidet shower, the user has only to remove the pistol from the support, displacing the outer end of the rod upwardly, to the raised position, in which the movable sealing means is conducted to the seat opening condition, which condition will be maintained until the user returns, downwardly, the pistol on the support, forcing the outer end of the rod downwardly, to the lowered position, in which the movable sealing means is conducted to the seat closing condition.

BRIEF DESCRIPTION OF THE DRAWINGS

The invention will be described below, with reference being made to the appended drawings, given by way of example of a possible way of carrying out the invention and in which.

DESCRIPTION OF THE INVENTION

Figure 1:
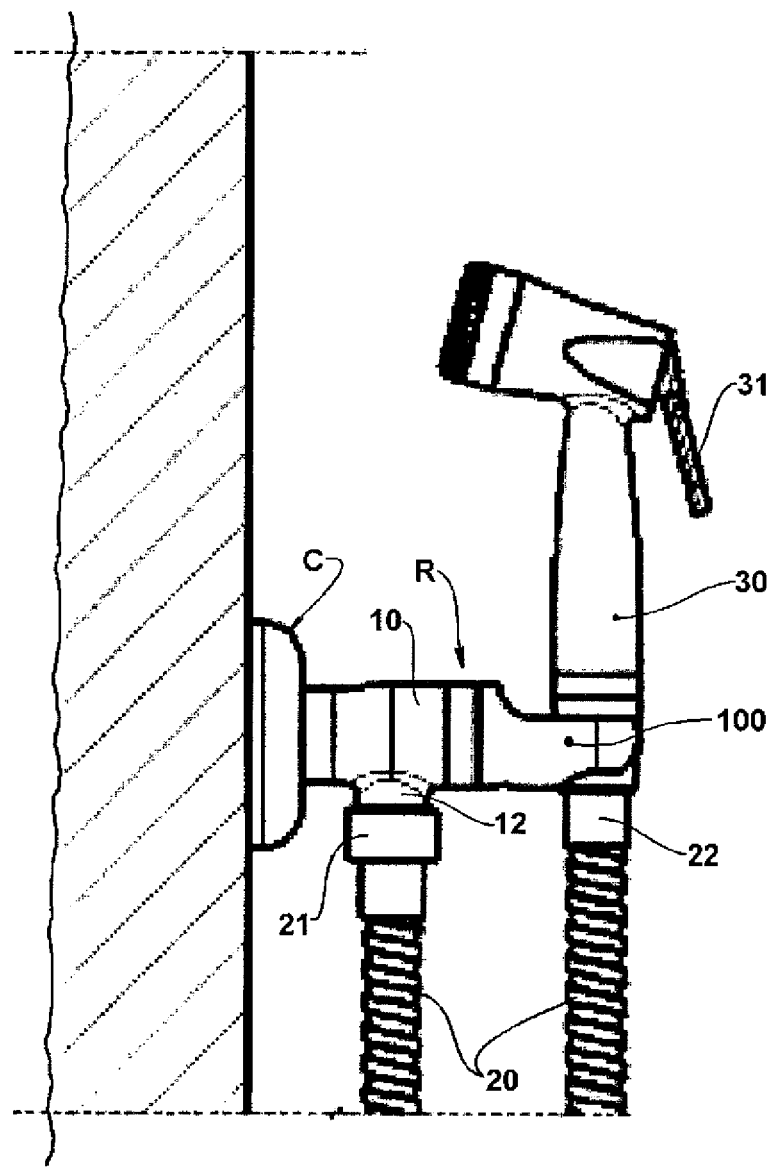
FIG. 1 represents a lateral view of a hand held bidet shower, with its flexible conduct being partially cut and presenting the control valve of the present invention already affixed to a building wall and having the outer end of the rod of the driving means in the seat closing lowered position, with the pistol in the inoperative condition, that is, received and retained on the support.

As illustrated in the appended drawings, the control valve R is defined by a body 10, which may be cast or forged in metallic alloy, or also injected in plastic material, that is, a material adequate for this type of device, which is internally hollow and provided with an inlet nozzle 11, usually associated with a escutcheon C and to be connected to a terminal nozzle of a hydraulic system (not illustrated), usually installed in a wall P of a building, and with an outlet nozzle 12, to be connected to an inlet end 21 of a flexible conduct 20 of the hand held bidet shower and which may be built in several well known prior art manners.

The body 10 is further provided with an auxiliary nozzle 13, generally presenting an inner thread 13a and which may be axially aligned with the inlet nozzle 11.

The flexible conduct 20 has an outlet end 22 to which is mounted a pistol 30, usually provided with a trigger valve, which is represented in the drawings only by its trigger 31. The pistol 30 may present different constructions well known in the art, its particular construction not being a relevant aspect in the present invention. The pistol 30 may be further provided with a lock (not illustrated), operatively associated with the trigger 31, in order to keep the trigger valve in an open condition, even if the user ceases to actuate on the trigger 31.

The inlet nozzle 11 and the outlet nozzle 12 are generally, but not compulsorily, orthogonal to each other and kept in a selective fluid communication to each other and through a sealing seat S, internal to the body 10 of the control valve R and to be described hereinafter.

The body 10 of the control valve R is further provided with a movable sealing means V, operatively associated with the sealing seat S and to be displaced, by a driving means MA, between closing and opening positions of the seat S.

The present control valve R may further comprise, in the interior of the body 10, a tubular sleeve 40, in metallic alloy or in plastic material, having a first end 41, seated against an annular gasket G which, on its turn, is seated against an inner annular stop of the body 10. The tubular sleeve 40 presents a median region 42 and a second end 43, the latter being provided with an outer thread 43a and projects axially outwardly from the auxiliary nozzle 13 of the body 10.

The tubular sleeve 40 is axially locked in the interior of the body 10 by means of a threaded bushing 50 which is provided with an outer thread 50a, to be engaged with the inner thread 13a of the auxiliary nozzle 13, and with a peripheral flange 51 to be seated against the auxiliary nozzle 13 with the provision of a sealing ring therebetween, in elastomer. The tubular sleeve 40 may be rotated in the interior of the body 10 until its final mounting position is defined, when it may be affixed, against rotation, through a locking nut 60 provided with an inner thread 60a which is engaged to the outer thread 43a of the second end 43 of the tubular sleeve 40, said locking nut 60 being axially pressed against the body 10, around its auxiliary nozzle 13, in order to rotationally lock the tubular sleeve 40 in the body 10.

The tubular sleeve 40 is medianly and externally provided with at least one circumferential groove 44, in the interior of which is housed the "O-ring" 44a, in elastomer, which actuates against the threaded bushing 50, in order to guarantee the sealing between the latter and the tubular sleeve 40.

In the illustrated construction, which includes the provision of the tubular sleeve 40, the seat S is defined by a fixed ceramic disc 70, mounted in the interior of the body 10, more specifically in the interior of the first end 41 of the tubular sleeve 40, and which is seated against the annular gasket G. The fixed ceramic disc 70 is provided with at least one through hole 71.

In the illustrated construction, the movable sealing means V is defined by a movable ceramic disc 80, which is slidingly seated on the fixed ceramic disc 70, so as to be displaced between the closing position of the seat S, blocking the through hole 71 of the fixed ceramic disc 70, and the opening position of the seat S, unblocking, at least partially, said through hole 71.

Figure 4:
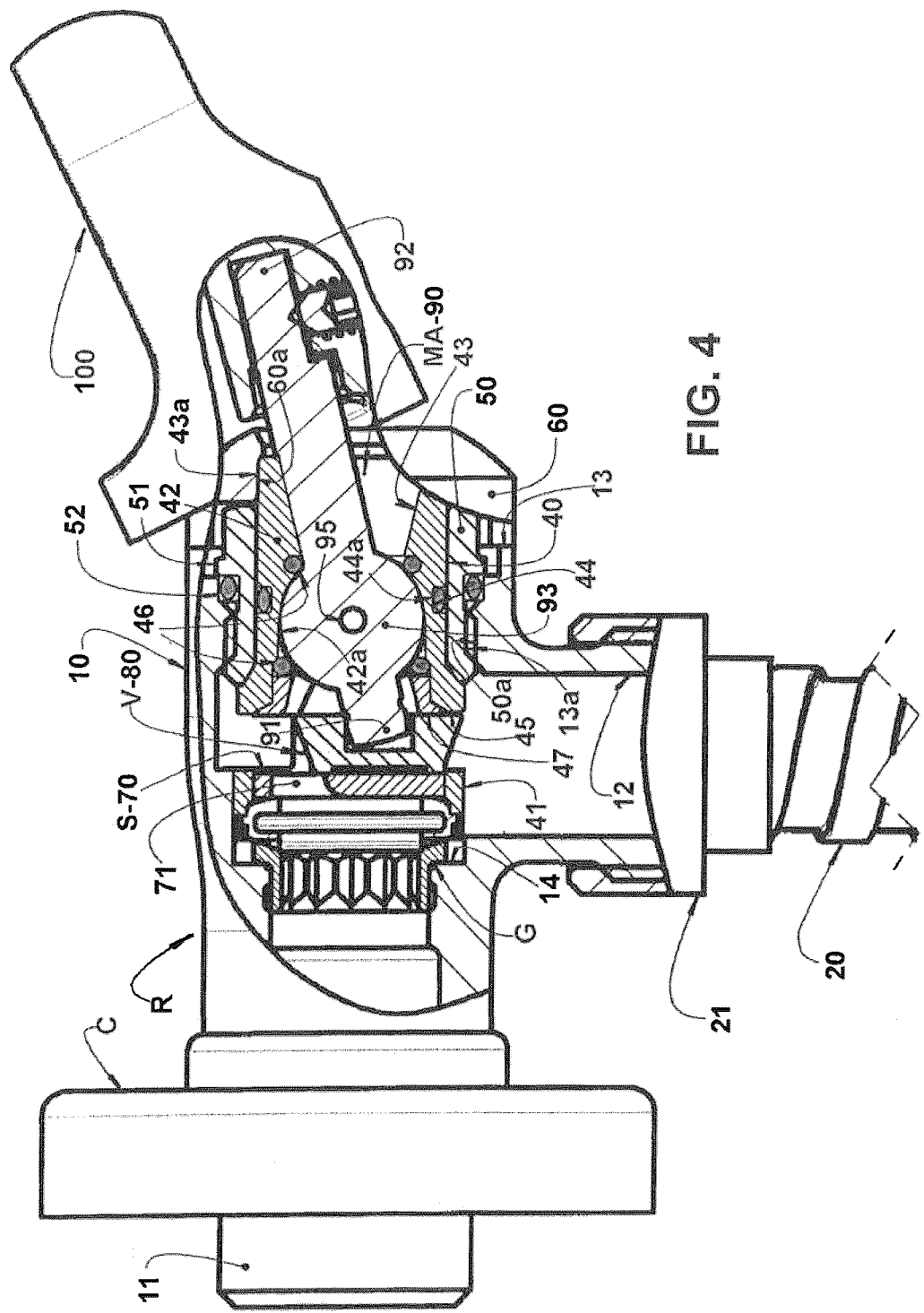
FIG. 4 represents a view similar to that of FIG. 3, but illustrating the outer end of the rod of the driving means in the raised position, in which the seat of the control valve is opened, when the pistol is removed from the support.

The tubular sleeve 40 is provided with radial windows 45, which are open to an internal region of the body 10 maintained in fluid communication with the outlet nozzle 12 and with the flexible conduct 20. Thus, when the movable sealing means V is taken to the opening position of the seat S, it allows for the fluid communication of the inlet nozzle 11 with the outlet nozzle 12 of the body 10 of the control valve, as illustrated in FIG. 4.

The tubular sleeve 40 is internally configured, in its median region 42, so as to define a cylindrical bearing 42a between two sealing rings 46, in elastomer, which are lodged in respective housings defined in the interior of said median region 42, the innermost sealing ring 46 being maintained in position by a tubular guide 47, made of a material with low coefficient of friction, such as ceramic material, and which is seated against the movable ceramic disc 80.

According to the invention, the driving means MA comprises a rod 90 having an inner end 91 coupled to the movable sealing means V, an outer end 92 projecting out from the body 10 through the auxiliary nozzle 13, and a median region 93 which is mounted in the body 10, allowing said rod 90 to be angularly and linearly displaced in a vertical plane and around a median transversal axis, between extreme operational positions, with the outer end 92 in lowered and raised positions, in which positions the movable sealing means V is conducted to the closing and opening positions of the seat S, respectively.

In the illustrated construction, the median region 93 of the rod 90 takes a cylindrical form, with the ends thereof projecting, each one, a shaft end 95 which is fitted in a respective radial housing (not illustrated) provided in the interior of the median region 42 of the sleeve 40. With such construction, the rod 90 may oscillate around the shaft ends 95, when its outer end 92 is moved by the operator, so that its inner end 91 provokes a corresponding linear displacement of the movable sealing means V between its closing and opening positions of the seat S of the control valve R.

Figure 2:
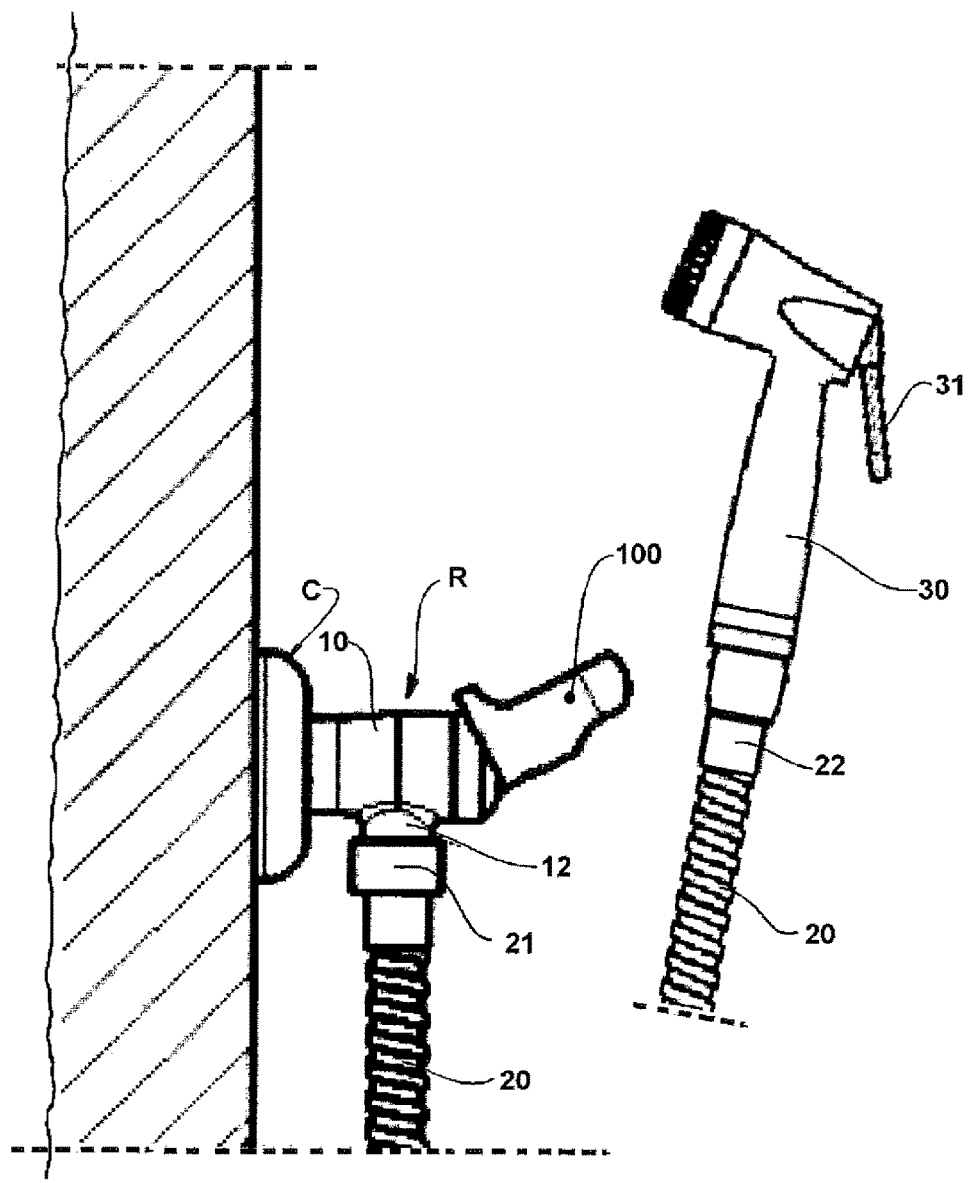
FIG. 2 also represents a lateral view of the hand held bidet shower of FIG. 1, but with the flexible conduct partially cut and having the outer end of the rod of the driving means taken to the raised position, with the pistol removed from the support.

Also according to the invention, it is provided a support 100, to be affixed to the outer end 92 of the rod 90 and which is configured in the form of a fork-like cradle, so as to receive and retain, by a downward fitting, the pistol 30 when the latter is in an inoperative condition. The construction described above allows the user to remove the pistol 30 from the support 100, displacing said pistol upwards and promoting the angular displacement of the outer end 92 of the rod 90 upwardly, to the opening condition of the seat S, as illustrated in FIGS. 2 and 4. Once the control valve R is opened, the user needs only to actuate the trigger 31 of the pistol 30 for obtaining the desired water jet.

Figure 3:
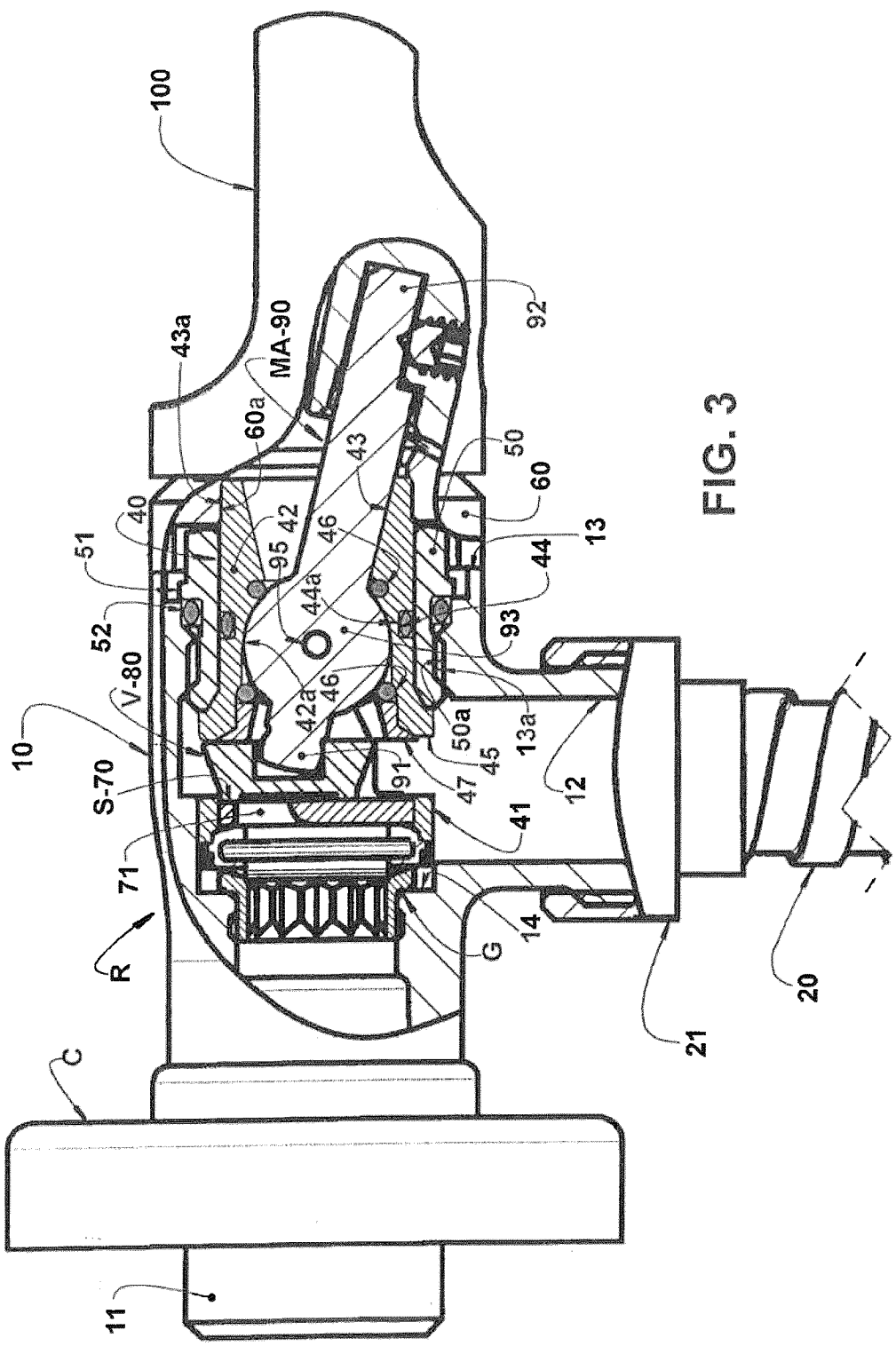
FIG. 3 represents a partial longitudinal sectional view of the present control valve, with the outer end of the rod of the driving means in the lowered position, in which the seat of the control valve is closed, when the pistol is downwardly received and retained on the support.

After using the hand held bidet shower, the user releases the trigger 31, closing the trigger valve of the pistol 30, which may be then repositioned on the support 100. Due to the construction of the support 100, it receives and retains the pistol 30 by the downward fitting of the latter in said support 100, which movement causes the angular displacement of the outer end 92 of the rod 90 downwardly, to the closing condition of the seat S, as illustrated in FIGS. 1 and 3.

It is also possible to build the driving means MA and the pistol 30, so that the weight of the latter, when received and retained on the support 100, in conjunction with the weight of the flexible conduct 20, is sufficient to provoke the displacement of the outer end 92 of the rod 90 of the driving means MA to the lowered position, in which the inner end 91 of the rod 90 conducts the movable sealing means MA to the closing position of the seat S. In this case, the user needs only to replace the pistol 30 in the support 100, so that the weight of said pistol 30 causes, automatically, the angular displacement of the rod 90 and the consequent closing of the control valve R.

While only one embodiment of the present control valve has been illustrated herein, it should be understood that several changes as to the form and arrangement of the different component parts may be carried out, without departing from the inventive concept defined in the claim set that accompanies the present specification.

The invention claimed is:

1. A flow control valve for a hand held bidet shower, comprising a body (10) having an inlet nozzle (11) connectable to a hydraulic system and an outlet nozzle (12); a flexible conduit (20) having an inlet nozzle (21) connected to the outlet nozzle (12) of the body (10) and an outlet end (22); a pistol (30) connected with the outlet end (22) of the flexible conduit (20) and having a valve and a trigger for driving the valve; an auxiliary nozzle (13); a sealing seat (S) communicating with the inlet (11) and outlet (12) nozzles of the body (10); movable sealing means (V) operatively associated with the sealing seat (S) and displaceable between closing and opening positions of the sealing seat (S); and driving means (MA) for displacing the movable sealing means (V), wherein the driving means (MA) has a rod (90) having an inner end (91) coupled to the movable sealing means (V), an outer end (92) projecting from the body (10) through the auxiliary nozzle (13), and a median region (93) mounted on the body (10), whereby the rod (93) is displaced in a vertical plane around a median transversal axis between operational positions, with the outer end (92) having lowered and raised positions in which the movable sealing means (V) is movable between the closing and opening positions of the sealing seat (S), respectively, the outer end (92) of the rod (90) being provided with a support (100) for receiving and retaining the pistol (30) when the pistol is in an inoperative condition, wherein the sealing seat (S) is defined by a fixed ceramic disc (70) mounted in interior of the body (10) provided with at least one through hole (71), the movable sealing means (V) is defined by a movable ceramic disc (80) slidingly seated against the fixed ceramic disc (70) for displacement between the closing position of the sealing seat (S) in which the movable ceramic disc (80) blocks, the through hole (71) of the fixed ceramic disc (70); and the opening position of the sealing seat (S) in which the movable ceramic disc (80) unblocks, at least partially, the through hole (71), and wherein the control valve further comprise a tubular sleeve (40) mounted in the interior of the body (10) and has a first end (41) adjacent the inlet nozzle (11) and seated against an inner annular stop (14) of the body (10), a median region (42), and a second end (43) provided with an outer thread (43a) which projects axially outward from the auxiliary nozzle (13) of the body (10), the fixed and movable ceramic discs (70, 80) being mounted in interior of the first end (41) of the tubular sleeve (40), with the fixed ceramic disc (70) and the first end (41) of the tubular sleeve (40) seated against the annular stop (14) of the body (10) with an annular gasket (G) arranged between the first end (41) of the tubular sleeve (40) and the annular stop (14) of the body (10) and the median region (93) of the rod (90) mounted in interior of the median region (42) of the tubular sleeve (40).

2. The control valve, according to claim 1, wherein weight of the pistol (30), when received and retained on the support (100) jointly with weight of the flexible conduit (20), is sufficient to provoke displacement of the outer end (92) of the rod (90) to the lowered position in which the inner end (91) of the rod (90) moves the movable sealing means (V) to the closing position of the sealing seat (S).

3. The control valve according to claim 1, wherein the auxiliary nozzle (13) of the body (10) is provided with an inner thread (13a), the control valve (R) further comprising a threaded bushing (50) provided with an outer thread (50a) for engagement with the inner thread (13a) of the auxiliary nozzle (13) for to axially locking the tubular sleeve (40) in the body (10); and a locking nut (60) provided with an inner thread (60a) for engaging the outer thread (43a) of the second end (43) of the tubular sleeve (40), the locking nut (60) being axially pressed against the body (10) to rotatively lock in the tubular sleeve (40) in a desired position.

4. The control valve according to claim 1, characterized in that the tubular sleeve (40) is provided with radial windows (45), which are open to the interior region of the body (10) and maintained in fluid communication with the outlet nozzle (12).

5. The control valve according to claim 1, wherein the median region (93) of the rod (90) has a cylindrical form and is provided with a shaft (95) having its ends projecting therethrough, with each shaft end fitting in a respective radial housing provided in the interior of the median region (42) of the tubular sleeve (40), the median region (42) of the tubular sleeve being internally configured to define a cylindrical bearing (42*a*) for the cylindrical shaped median region (93) of the rod (90).

\* \* \* \* \*